(12) United States Patent
Ip

(10) Patent No.: US 12,067,578 B1
(45) Date of Patent: Aug. 20, 2024

(54) NETWORKED MESSAGING SYSTEMS AND METHODS OF ALLOWING MULTIPLE COMPANIES OPERATING ON A VALUE CHAIN TO SERVE A CUSTOMER SIMULTANEOUSLY

(71) Applicant: Ying Hoi Robert Ip, Hong Kong (HK)

(72) Inventor: Ying Hoi Robert Ip, Hong Kong (HK)

( * ) Notice: Subject to any disclaimer, the term of this patent is extended or adjusted under 35 U.S.C. 154(b) by 24 days.

(21) Appl. No.: 17/241,093

(22) Filed: Apr. 27, 2021

(51) Int. Cl.
| | | |
|---|---|---|
| *G06F 40/35* | (2020.01) |
| *G06F 3/0482* | (2013.01) |
| *G06F 3/0484* | (2022.01) |
| *G06F 40/166* | (2020.01) |
| *G06Q 30/00* | (2012.01) |
| *G06Q 30/016* | (2023.01) |
| *H04L 51/56* | (2022.01) |

(52) U.S. Cl.
CPC ......... *G06Q 30/016* (2013.01); *G06F 3/0482* (2013.01); *G06F 3/0484* (2013.01); *G06F 40/166* (2020.01); *G06F 40/35* (2020.01); *H04L 51/56* (2022.05)

(58) Field of Classification Search
CPC ...................................................... G06F 40/35
See application file for complete search history.

(56) References Cited

U.S. PATENT DOCUMENTS

| | | | | |
|---|---|---|---|---|
| 2009/0265643 | A1* | 10/2009 | Jachner et al. | ......... G06F 15/16 |
| 2019/0236155 | A1* | 8/2019 | Bachrach et al. | .. G06F 17/3043 |
| 2020/0334740 | A1* | 10/2020 | Bedell et al. | ......... G06Q 30/06 |
| 2022/0300716 | A1* | 9/2022 | Sabharwal et al. | |

* cited by examiner

*Primary Examiner* — James J Debrow

(57) ABSTRACT

According to embodiments of the invention, systems and methods are provided for showing messaging on a customer window established between a first (main serving company), second (customer), third (second company on same value chain of a given service or product related to a customer question), and fourth (third company on same value chain of a given service or product related to a customer question) network nodes. This configuration supports direction interaction concerning multiple companies, rather than just support single facing, where the customer support officer does not have answers relating to certain matters involving outside companies due to sub-contracting of products and services. This invention improves service quality and increase customer satisfaction by incorporating company representatives from many companies involved in a given product and service.

8 Claims, 4 Drawing Sheets

NETWORKED MESSAGING SYSTEMS AND METHODS OF ALLOWING MULTIPLE COMPANIES OPERATING ON A VALUE CHAIN TO SERVE A CUSTOMER SIMULTANEOUSLY

FIELD OF THE INVENTION

The invention relates generally to networked messaging systems and method, and more specifically, allowing multiple companies operating on a value chain to serve a customer simultaneously.

BACKGROUND OF THE INVENTION

The primary use of a messaging kit for communication is to share information via text with a group of other users. Generally speaking, the ability to converse with multiple people in the same conversation differentiates messaging areas from instant messaging programs, which are more typically designed for one-to-one communication. The users in a particular messaging area are generally connected via a shared internet or other similar connection, and messaging areas exist catering for a wide range of subjects. New technology has enabled the use of file sharing and webcams to be included in some programs. This would be considered a messaging area.

A web messaging service provide networked visitors with an ability to communicate with a human operator who is responsible for handling instant inquiries associated with a particular website via a UI environment. Typically, during operation, a web messaging service generates a messaging, which facilitates text-based communications between a networked visitor and the human operator who is responsible for handling queries from the networked visitor and gathering information concerning the networked visitor. The gathered information may be used for subsequent communications with that networked visitor. While the web messaging service may benefit networked visitors by providing him or her with specific information to make informed purchasing decisions, it also introduces a number of logistical problems.

For example, deploying a web messaging service with customer service representatives who are required to type every question and subsequent responses is expensive and sometimes ineffective for active social media lots of customers seeking for answers and or support. To support the staffs and/or customers a networked messaging service for a corporate ecommerce environment, a large group of human representatives would be needed to ensure that the networked visitors are not experiencing unacceptable delays, which would adversely affect the web messaging service's ability to convert networked visitors into consumers. Furthermore, the parsing of free-flow messaging information by a representative is not only inefficient but is also difficult to perform sufficiently on a regular basis. As a result, due to complicated nature of questions, it is sometimes difficult for the customer representatives to come up with answers immediately, especially if the answers would involve other suppliers down the value chain.

In lieu of web messaging services relying on just customer service representatives from a single operators, it is quite short-handed if the customers come up with questions that may involve other technical expertise from the supplier companies (i.e. not within the service or product provider where the customer representative is currently engaging with the customer). This has caused issues, especially when the customer is seeking for immediately answers from the customer representative but failing to provide prompt answers because the question involves answers from other suppliers in the value chain.

SUMMARY OF THE INVENTION

According to embodiments of the invention, systems and methods are provided for networked messaging system allowing multiple companies operating on a value chain to serve a customer simultaneously. The networked chat system functioning on a networked messaging system, including software for execution by one or more hardware processors deployed within a network node representing a main serving company.

In one embodiment, a system is provided. The system comprises a messaging window. The window is configured for the customer displayable on at least four users involved in the networked chat system. Each user is represented on one side of the messaging window, including one on a left side facing 90 degrees from a customer's position and one on a right side facing 90 degrees from the customer's position.

In the embodiment, the system further includes a messaging console logic. When executed by the one or more hardware processors, the console logic monitors moving progress being conducted on a website associated with the network node and commences to establish a messaging dialogue window with a second network node representing a customer upon detecting a certain navigation activity.

Further in the embodiment, the system includes a messaging augmentation logic. When executed by the one or more hardware processors, the augmentation logic generates content associated with the messaging dialogue window. The content of the window includes a messaging query. Further, the content window includes one or more connected answers to the messaging query that, upon selection, returns a predetermined answer to the messaging query, (iii) a text field, wherein, upon entry of text data within the text field that belongs to a customer question related to other secondary service providers including a second company and a third company.

As interpreted by the messaging augmentation logic as any of the one or more connected answers, the messaging augmentation logic notifies the messaging console logic to bring in the other service providers to join the messaging dialogue window within the messaging window at same time by establishing communication with a third network node representing the second company displayed on the left side of the messaging window and a fourth network node representing the third company displayed on the right side of the messaging window, hence enabling a human operator from the second and third companies to participate in the messaging dialogue window. Further, the content window includes a third party response from the either the second or third company.

The content is then displayed to the messaging window allowing the main serving company, the customer, the second company, and the third company to navigate the content.

At the same time, the progress of the messaging dialogue window is monitored, and continues to generate a subsequent messaging query along with connected answers corresponding to the subsequent messaging query, the connected answers include one or more highlighted answer items generated either by the main serving company, the customer, the second company, or the third company.

In a further embodiment, the messaging console logic includes visitor tracking service logic that, when executed, monitors the moving progress being conducted on the website hosted by the network node and transmits a messaging solicitation content in response to detecting the certain navigation activity.

Additionally, the networked messaging system further includes that the certain navigation activity corresponds to selection of a particular image or menu selection on the website.

Alternatively, the certain navigation activity of the networked messaging system corresponds to a particular pattern of navigation activity.

As an additional implementation, the networked messaging system includes that the messaging augmentation logic comprises a messaging generator that generates the content associated with the messaging dialogue window in accordance with a text executed by the messaging generator, the text being configured to correspond to either an industry or a provider pertaining to the website.

Moreover, each of the one or more highlighted answer items corresponds to a selectable display button. The messaging console logic further includes messaging service logic that, when executed, may conduct a secondary analysis on data received by the messaging augmentation logic during the messaging dialogue window when the Messaging control logic being unable to interpret data entered into the one or more connected answers.

A separate embodiment is provided. A computerized method is provided that comprises establishing a messaging dialogue window by a first network node with a second network device; generating displayable content during the messaging dialogue window for transmission by the first network device. The displayable content may include a first messaging query, a first set of connected answers to the first messaging query, and a first text field. The method transmits the displayable content by the first network node to the second network device; responsive to detecting a selection of a first interactive response of the first set of connected answers at the second network device, generating at least a second messaging query and a second set of connected answers to the second messaging query for transmission by the first network node to the second network device; and responsive to detecting text entry within the first text field, provider an operator with access to the messaging dialogue window for response to the text entry.

Another implementation is provided. A computerized method is provided for networked messaging system allowing multiple companies operating on a value chain to serve a customer simultaneously. It comprises generating content associated with a messaging dialogue window to be displayed on a messaging window for the customer displayable on at least four users involved in the networked chat system. Each is represented on one side of the messaging window, including one on a left side facing 90 degrees from a customer's position and one on a right side facing 90 degrees from the customer's position, the content may include a messaging query, one or more connected answers to the messaging query that, upon selection, returns a predetermined answer to the messaging query, a text field, wherein, upon entry of text data within the text field that belongs to a customer question related to other secondary service providers including a second company and a third company, as interpreted by the messaging augmentation logic as any of the one or more connected answers, the messaging augmentation logic notifies the messaging console logic to bring in the other service providers to join the messaging dialogue window within the messaging window at same time by establishing communication with a third network node representing the second company displayed on the left side of the messaging window and a fourth network node representing the third company displayed on the right side of the messaging window, hence enabling a human operator from the second and third companies to participate in the messaging dialogue window.

A third party response from the either the second or third company; and displays the content to the messaging window allowing the main serving company, the customer, the second company, and the third company to navigate the content in a messaging window.

The messaging window then displays a progress of the messaging dialogue window, and continues to generate a subsequent messaging query along with connected answers corresponding to the subsequent messaging query, the connected answers include one or more highlighted answer items generated either by the main serving company, the customer, the second company, or the third company.

As a further embodiment, a networked messaging system is provided allowing multiple companies operating on a value chain to serve a customer simultaneously. The networked chat system functions on a networked messaging system, including software for execution by one or more hardware processors deployed within a network node representing a main serving company. The company includes a five-sided messaging window for the customer supporting concurrent display of at least five users involved in the networked chat system, each represented on one side of the messaging window, wherein a first side is at 72 degrees from an adjacent second side, displayed of each side being rotatable and freely viewable by the customer. Included is a messaging console logic that, when executed by the one or more hardware processors, monitors moving progress being conducted on a website associated with the network node and commences to establish a messaging dialogue window with a second network node representing a customer upon detecting a certain navigation activity. The messaging augmentation logic includes that, when executed by the one or more hardware processors, generates content associated with the messaging dialogue window, the content includes a messaging query, one or more connected answers to the messaging query that, upon selection, returns a predetermined answer to the messaging query, a text field, wherein, upon entry of text data within the text field that belongs to a customer question related to other secondary service providers including a second company and a third company, as interpreted by the messaging augmentation logic as any of the one or more connected answers, the messaging augmentation logic notifies the messaging console logic to bring in the other service providers to join the messaging dialogue window within the messaging window at same time by establishing communication with a third network node representing the second company displayed on the first side of the messaging window and a fourth network node representing the third company displayed on the second side of the messaging window, hence enabling a human operator from the second and third companies to participate in the messaging dialogue window; an a third party response from the either the second or third company, displays the content to the messaging window allowing the main serving company, the customer, the second company, and the third company to navigate the content; and monitors a progress of the messaging dialogue window, and continues to generate a subsequent messaging query along with connected answers corresponding to the subsequent messaging query, the connected answers include one or more highlighted answer items generated either by the main serving company, the customer, the second company, or the third company.

A better understanding of the disclosed technology will be obtained from the following brief description of drawings illustrating exemplary embodiments of the disclosed technology.

BRIEF DESCRIPTION OF THE DRAWINGS

Embodiments of the disclosure are illustrated by way of example and not by way of limitation in the figures of the accompanying drawings, in which like references indicate similar elements and in which.

Figure 1:
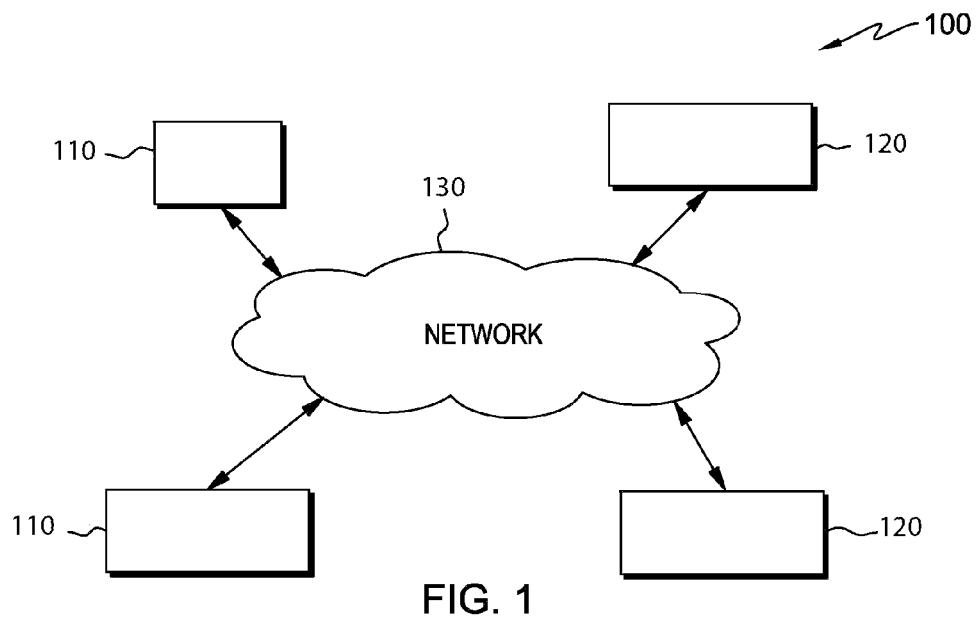
FIG. 1 is an illustrative embodiment of an exemplary semi-artificial intelligent messaging service system providing a standardized set of answer itemss in communications between the messaging server and a messaging participant.

A better understanding of the disclosed technology will be obtained from the following detailed description of embodiments of the disclosed technology, taken in conjunction with the drawings.

DETAILED DESCRIPTION

References will now be made in detail to the present exemplary embodiments, examples of which are illustrated in the accompanying drawings. Certain examples are shown in the above-identified figures and described in detail below. In describing these examples, like or identical reference numbers are used to identify common or similar elements. The figures are not necessarily to scale and certain features and certain views of the figures may be shown exaggerated in scale or in schematic for clarity and/or conciseness.

Embodiments of the disclosure are directed to a semi-artificial intelligent messaging service provided by Messaging console logic and Messaging augmentation logic of a network node. In general, the Messaging console logic controls formation of a messaging while the Messaging augmentation logic controls communications associated the semi-artificial intelligent messaging service by the network node during the messaging. Collectively, these logic units provide an automated messaging service, while at the same time, provide access to operator-based messaging communications to handle certain instances where operator interaction is requested or essential in response to text entry interpretation failures. These node-controlled communications are configured to improve accuracy in data collection by the network node while, at the same time, decrease the total amount of time typically need for such data collection. The data collection may be directed to a gathering of data to complete a networked, interactive form that is specific to a particular service or product provider (e.g., financial service provider, legal service provider, vehicle dealer, etc.) or a particular industry (e.g., loan procurement, legal referral, vehicle purchase or lease, etc.). The data may be subsequently transmitted to a service or product provider in a format selected by that provider.

More specifically, the Messaging augmentation logic features a scriptable, automated messaging generator that controls communications with a targeted network node after a messaging has been established by the Messaging console logic. According to one embodiment of the disclosure, the automated messaging generator operates in accordance with one or more scripts, where each script includes a plurality of rules that may be tailored for a particular provider. Upon processing these rules, the automated messaging generator iteratively generates, for display at the targeted network node, a messaging query followed by a set (one or more) of possible answers associated with that question until a threshold amount of data has been collected (e.g., at least a predetermined number of messaging querys have been directly answered through connected answers or indirectly answers by an operator auto-selecting of the corresponding interactive response). The selection of a particular script may be determined by parsing information included in a Messaging affirmation content and interpreting which provider (or industry) the messaging pertains.

According to one embodiment of the disclosure, a script includes an List of items that collectively formulate a decision tree having multiple messaging execution paths. Each object of the script includes (i) one or more alphanumeric characters, symbols or images that are used to formulate a text question to a messaging participant (hereinafter "messaging query"); (ii) one or more connected answers each corresponding to a possible, predetermined answer to the messaging query; and (iii) a behavior that identifies a next segment of the script to be executed upon transmission of the messaging query and corresponding connected answers during the messaging. Herein, the connected answers may include one or more highlighted answer items (e.g., one or more selectable standardized inputs such as selectable display buttons, drop-down menus, etc.) and/or one or more text boxes. The one or more text boxes prompt the messaging participant to enter requested information as an answer to a particular messaging query. The messaging query and corresponding connected answers enable structured networked data entry and retrieval. The script may be provided as a JavaScript Object Notation (JSON) object for example.

As described above, each script is configured to control operations of the messaging generator to generate a plurality of messaging querys and their corresponding connected answers, where information provided with each interactive response corresponds to an answer associated with a networked, interactive form represented by that script. When highlighted answer items are provided for use by the messaging participant, the selected answer items is highlighted and remains in the messaging to allow the messaging participant to recall her or his answers and correct any errors, as necessary. Especially on mobile nodes where text entry is challenging, the Messaging augmentation logic offers one-touch options that increase the speed at which a networked interactive form can be completed (decrease response time) and reduces overall costs for handling networked product or service inquiries through increased accuracy in data capture.

In addition to providing highlighted answer items, the messaging generator may generate one or more edit box (generally referred to as "text field") to accompany the connected answers and the corresponding messaging query. The text field allows the messaging participant to conduct free-form text communications with a secondary, automated messaging service is that not directed to gathering personal identifiable information associated with the messaging participant or with a "live" (human) operator.

In addition to the messaging generator, the Messaging augmentation logic may further include Info confirmation logic to confirm that the answers set forth in the text box are compliant with the type of information requested. Additionally, the Messaging augmentation logic may further include Messaging that attempts to interpret the free-form text entered into the text field and auto-select a particular interactive response corresponding to the interpreted text. Where the Messaging is unable to interpret the free-form text entry, the text data may be provided to the Messaging console logic for selection of a "live" (human) operator to intervene in the messaging to offer assistance in interpreting the prior text entry into the text field and auto-selecting the corresponding interactive response before returning control back to the messaging generator to continue execution of the selected script. As an optional feature, the Messaging console logic may conduct a secondary messaging exchange that is directed to interpreting a prior text entry, and if successful, returning control back to the messaging generator to continue execution of the selected script.

As described above, the messaging generator is automated under control of the script and remains automated as long as the messaging participant continues to answer messaging querys in accordance with one of the messaging execution paths. In other words, based on the answers provided to the messaging querys produced by the script, the messaging generator continues to generate subsequent messaging querys in accordance with a prescribed messaging execution path. Upon completion of the messaging execution path, the networked interactive form represented by the script also has been completed and the Archived data, which pertains to answers to the messaging querys during the messaging, is forwarded to a targeted provider.

However, if at any time during the messaging, the messaging participant provides one or more answers that are inconsistent with the line of messaging querys associated with a messaging execution path and cannot be interpreted by Messaging or the messaging participant requests a "live" operator, the Messaging augmentation logic may notify the Messaging console logic to connect an available operator to the current messaging. Thereafter, the operator can communicate in real-time with the messaging participant via the messaging in efforts to collect data associated with a messaging query (or auto-select one of the connected answers to a particular messaging query) and return the messaging participant back to answering the series of messaging querys produced by the automated messaging generator in accordance with the messaging execution path. This allows the messaging participant to request clarification on queries by a human operator at any time, and after such clarification, return back to the automated process. As an alternative, as described above, prior to the Messaging console logic facilitating intervention by the "live" operator, it is contemplated that the Messaging console logic may attempt to interpret the answer provided by the messaging participant through a secondary question/answer series that is not tailored in accordance with the selected script that may be Programming logicd for data gathering.

Furthermore, given that the presence of highlighted answer items as well as free-form messaging capabilities, the network node deploying the semi-artificial intelligent messaging service may experience increased accuracy in data capture and the captured data may be highly correlated to requisite information associated with a networked, interactive form for the targeted provider. The increased accuracy benefits both the targeted provider (receives data for contacting the messaging participant after termination of the messaging that is typically more reliable than data captured through keyed user input) and the messaging participant (avoids repetitive question/answer sessions). Additionally, the semi-artificial intelligent messaging service reduces the overall per messaging cost since many businesses that cannot afford typical free-form messaging on their own websites, but desire such functionality.

I. Terminology—In the following description, certain terminology is used to describe features of the invention. For example, in certain situations, the terms "logic" and "engine" are representative of hardware, firmware and/or software that is configured to perform one or more functions. As hardware, logic (or engine) may include circuitry having data processing or storage functionality. Examples of such circuitry may include, but are not limited or restricted to a hardware processor (e.g., microprocessor with one or more processor cores, a digital signal processor, a programmable gate array, a microcontroller, an application specific integrated circuit "ASIC", etc.), a semiconductor memory, or combinatorial elements.

Alternatively, the logic (or engine) may be software, such as executable Programming logic in the form of an executable application, an Application Programming Link (API), a subroutine, a function, a procedure, an applet, a servlet, a routine, source Programming logic, object Programming logic, a shared library/dynamic load library, or one or more instructions. The software, when executed, performs certain functionality. The software may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; semiconductor memory; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory node. As firmware, the executable Programming logic may be stored in persistent storage.

The term "network node" should be construed as electronics with the data processing capability along with hardware (e.g., connectors, wireless chipsets including antennas) for connecting to any type of network, such as a public network (e.g., Internet) or a cellular network, a private network (e.g., a wireless data telecommunication network, a local area network "LAN", etc.), or a combination of networks. Examples of a network node may include, but are not limited or restricted to, the following: a server, an endpoint node (e.g., a laptop, a smartphone, a tablet, a desktop computer, a netbook, a medical node, or any general-purpose or special-purpose, user-controlled electronic node); a mainframe; a router; or the like.

A "message" generally refers to information transmitted in one or more electrical signals that collectively include electrically storable data in a prescribed format. Each message may be in the form of one or more packets, frames, an HTTP-based transmission, or any other series of bits having the prescribed format.

The term "computerized" generally represents that any corresponding operations are conducted by hardware in combination with software and/or firmware.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

II. General Architecture—Referring to FIG. 1, an exemplary block diagram of a communication system 100 supporting a semi-artificial intelligent messaging service is shown. Herein, the communication system 100 includes a first network node 110 that is communicatively coupled with one or more second network nodes 120.sub.1-120.sub.N (N.gtoreq.1) via a network 130. The network 130 may be a single network (e.g., public network or private network) or a collection of networks, such as a public network operating in cooperation with a private network (e.g., an organization or enterprise network) for example.

Operating as a web (messaging) server by hosting a website that is accessible by the second network nodes 120.sub.1-120.sub.N, the first network node 110 includes a semi-artificial intelligent messaging service 140 that monitors moving progress by network nodes (e.g., second network node 120.sub.1) accessing the website. In response to detecting a certain navigation activity or navigation tendencies, the semi-artificial intelligent messaging service 140 transmits a messaging solicitation content 150 to the second network node 120.sub.1. The messaging solicitation content 150 invites the messaging participant in control of the second network node 120.sub.1 to establish a messaging with the semi-artificial intelligent messaging service 140.

According to one embodiment of the disclosure, the messaging solicitation content 150 may cause a browser application running on the second network node 120.sub.1 to open a messaging (new browser) window that includes a selectable image and/or a field for text entry. Upon return of a Messaging affirmation content to the semi-artificial intelligent messaging service 140, a bidirectional, messaging is established. The Messaging affirmation content may be returned in response to an activity performed by the messaging participant, such as selecting an image within the messaging, entering data within an initial text field of the messaging, or the like. Alternatively, it is contemplated that the messaging may be established without any activity performed by the messaging participant, as the session may be established upon transmission of the messaging solicitation content 150 and receipt of the message 150 by the second network node 120.sub.1.

Figure 4:
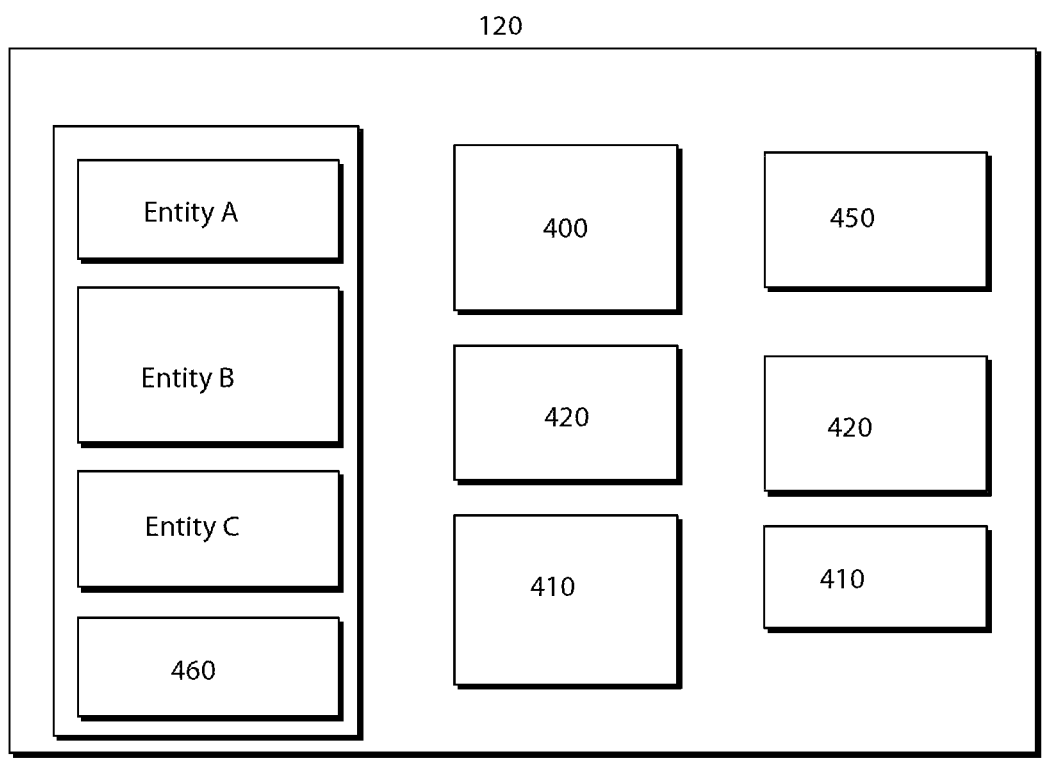
FIG. 4 is illustrative embodiments of a display screens of the second network node communicatively coupled to the web Messaging augmentation logic of FIG. 2 that generates connected answers during a messaging.

The semi-artificial intelligent messaging service 140 is configured to parse data included as part of the Messaging affirmation content and interpret the data to select a script from a Text database for use in controlling subsequent communications with the second network node 120.sub.1 during the messaging. The script automates the type and order of messaging querys produced by the semi-artificial intelligent messaging service 140 during the messaging as well as the type and/or format of connected answers (e.g., highlighted answer items, text field, etc.) that accompany some or all of these messaging querys, as shown in FIG. 4 for illustrative purposes. Additionally, the script may be configured to provide for display in the messaging a dedicated, fillable field for text entry, which allows the messaging participant to interact in a free-form manner with a "live" operator.

Figure 2:
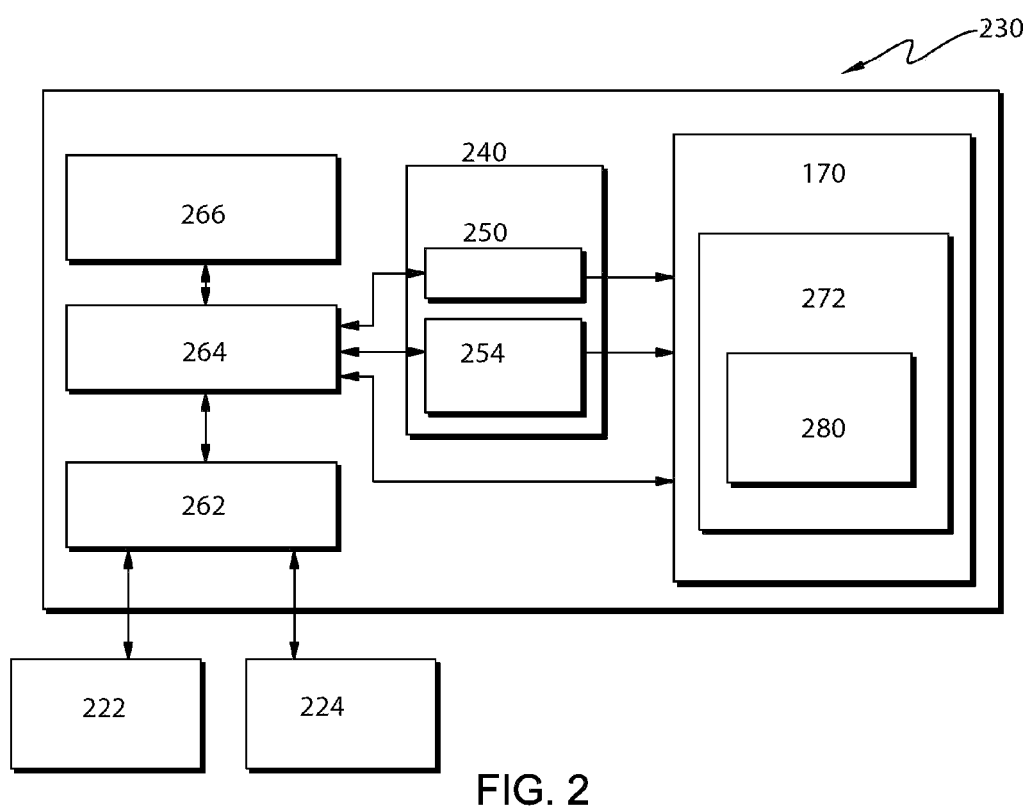
FIG. 2 is an illustrative embodiment of the first network node of FIG. 1 implemented with the semi-artificial intelligent messaging service.

Referring now to FIG. 2, an illustrative embodiment of the first network node 110 operating as a messaging server is shown. According to this embodiment of the disclosure, the first network node 110 comprises one or more processing unit (referred to as "processor(s)"), a non-transitory storage medium, and one or more node links (referred to as "node link(s)"). For instance, the node link(s) may include a network link 222, which supports connectivity to the network 130 of FIG. 1. The node link(s) may further include an input/output (I/O) link 224 that supports connectivity to a peripheral communicatively coupled to the first network node 110. These components may be at least partially encased in a container 230, which may be made entirely or partially of a rigid material (e.g., hard plastic, metal, glass, composites, or any combination thereof) that protects these components from environmental conditions.

The processor(s) is a multi-purpose, processing component that is configured to perform the semi-artificial intelligent messaging services upon executing net messaging 240 maintained within the non-transitory storage medium operating as a data store. Herein, one example of processor(s) include an Intel® central processing unit (CPU) with an x86-based instruction set architecture. Alternatively, processor(s) may include another type of CPU, a digital signal processor (DSP), an Application Specific Integrated Circuit (ASIC), a field-programmable gate array (FPGA), or any other hardware component with data processing capability.

As described in detail below, the net messaging 240 include (i) Messaging console logic 250 and (ii) Messaging augmentation logic. The Messaging console logic 250 includes visitor tracking service logic 252 and Messaging communication logic 254. The Messaging augmentation logic includes a messaging generator 262, Messaging 264 and Info confirmation logic 266. Although illustrated as software modules to be executed by processor(s), one or more portions of the Messaging console logic 250 and the Messaging augmentation logic may include hardware deployed within the first network node 110.

Figure 3:
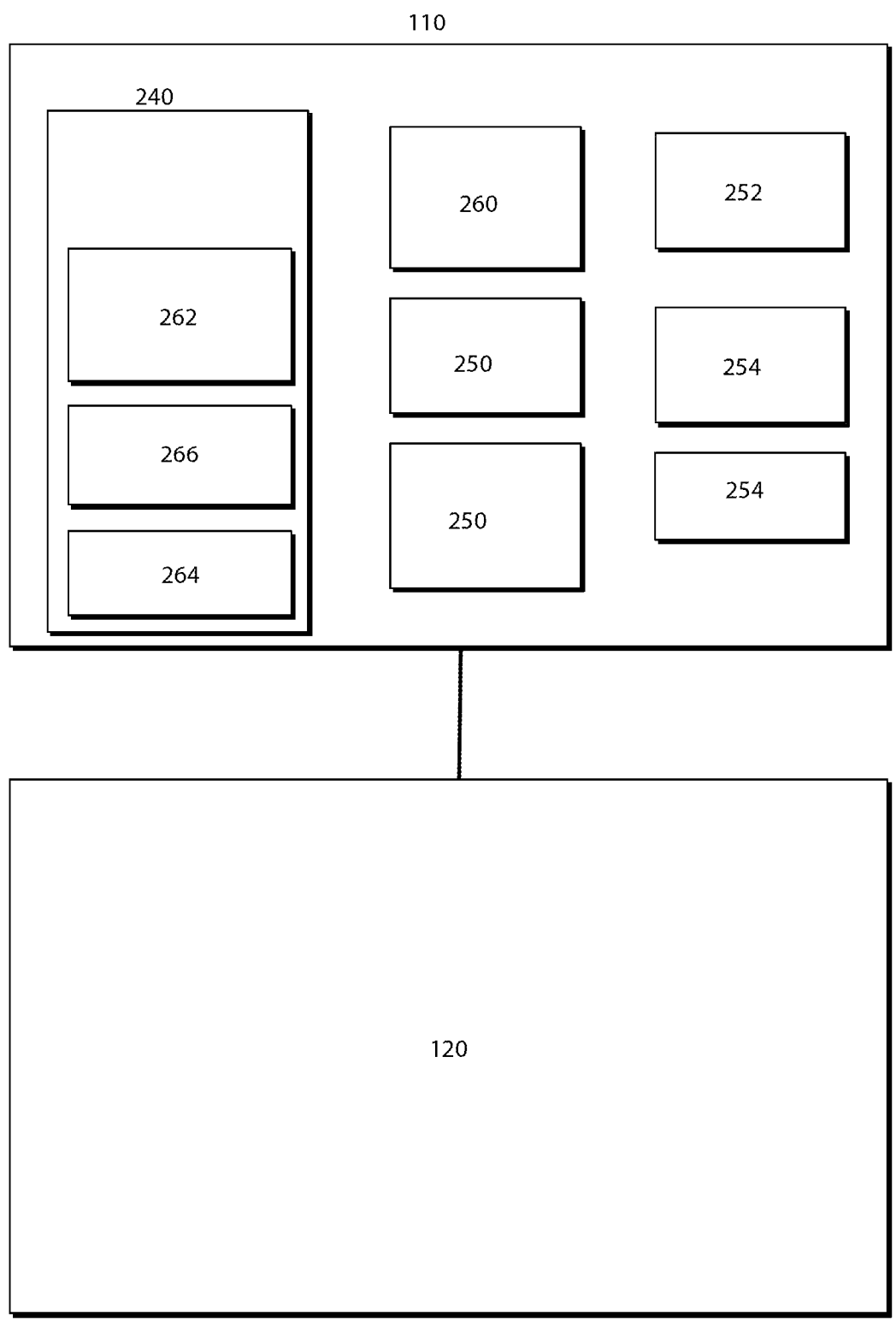
FIG. 3 is an illustrative embodiment of a logical representation of the net messaging of FIG. 2 that collectively operate as the semi-artificial intelligent messaging service of FIG. 1.

Referring now to FIG. 3, a logical representation of the net messaging 240, operating as a semi-artificial intelligent messaging service hosted by the first network node 110 is shown. According to one embodiment of the disclosure, the visitor tracking service logic 252 of the Messaging console logic 250 is configured to monitor moving progress 300 by a networked visitor operating the second network node 120.sub.1. In response to detecting a certain navigation activity, the visitor tracking service logic 252 transmits the messaging solicitation content 150 to the second network node 120.sub.1. The detected navigation activity may correspond to a particular event (e.g., selecting a particular image with an embedded link, selecting a pull-down menu on the website, particular movement of the mouse pointer, etc.) or a specific pattern of events (e.g., a particular navigation pattern on the website that is conducted by the second network node 120.sub.1, continuous connectivity to the website for more than a prescribed duration, etc.).

Besides being responsible for coordinating a transmission of the messaging solicitation content 150 to the second network node 120.sub.1, the visitor tracking service logic 252 is also responsible for monitoring receipt of the Messaging affirmation content that establishes a messaging 310 between the first network node 110 and the second network node 120.sub.1. After the messaging 310 is established, the Messaging augmentation logic is responsible for controlling communications between the first network node 110 and the second network node 120.sub.1.

Furthermore, operating in concert with the Messaging augmentation logic 260, the Messaging communication logic 254 may be configured to conduct a secondary analysis on data received by the Messaging augmentation logic during the messaging 310 when the Messaging 264 being unable to interpret such data. Alternatively, or in addition to the secondary analysis, the Messaging communication logic 254 may coordinate intervention by a "live" operator 320 into the messaging 310 in response to a certain activity being detected by the Messaging augmentation logic. Examples of such activity may include, but is not limited or restricted to (i) a messaging query answered by text entered into the dedicated fillable field in the messaging that cannot be interpreted by the Messaging 264, (ii) receipt of inconsistent data detected by the Messaging 264 after aggregating data from the answers to the connected answers, and/or (iii) selection of a particular interactive response (e.g., an "other" selectable answer items) that may initiate communications to a "live" operator for assistance. The "live" operator 320 may be selected by the Messaging communication logic 254 based on a number of parameters being monitored by the Messaging console logic 250. These parameters may include, but are not limited or restricted to the following: estimated wait time until the operator is available, geographic proximity to the messaging participant, category for the query, experience level needed to address the query, or the like.

Referring still to FIG. 3, the Messaging augmentation logic includes a scriptable, automated messaging generator 262 that is configured to generate messaging data in accordance with one or more scripts 270 (e.g., a first formula 272). Each of the scripts 270 may correspond to a targeted provider or a targeted industry. The scripts 270 may be preloaded into the non-transitory storage medium and updated in a periodic or aperiodic manner.

The Messaging augmentation logic further includes Messaging 264 that monitors progress of the messaging to detect activity that may require "live" operator intervention (e.g., a dedicated fillable field that is separate from the connected answers is used by the messaging participant in response to one of the messaging querys and/or data entered into the dedicated fillable field cannot be associated with one of the highlighted answer items).

More specifically, as illustrated in FIGS. 2-3, when operating in accordance with the first formula 272, the messaging generator 262 generates messaging data 410 for transmission from the first network node 110 for display within a messaging 400 at the second network node 120$i$. The messaging data 410 includes a messaging query 420 along with one or more connected answers, which may include (i) one or more highlighted answer items (e.g., one or more selectable standardized input such as selectable display buttons, drop-down menus, etc.) as shown in FIG. 4 and/or (ii) one or more edit box for the messaging participant to interact in a free-form manner as shown in FIG. 4.

According to one embodiment of the disclosure, the first formula 272 includes an List of items $280.sub.1-280.sub.M$ ($M.gtoreq.2$) that collectively formulate a decision tree having multiple messaging execution paths. Each object $280.sub.1-280.sub.M$ of the first formula 272 (e.g., object $280.sub.1$) includes Programming logic that, upon execution in accordance with a plurality of rules (that may be configured to control processing ordering of the objects; set a threshold amount of objects needed to be processed before messaging can discontinue upon detecting a level of frustrating growing in the messaging participant as measured by delays in receiving answers, text entries in the editable edit box 460 concerning the messaging duration or number of messaging querys remaining; etc.), displays the messaging query (Q) 420 followed by the plurality of connected answers (A), as described below. The object $280.sub.1$ further includes Programming logic 287 that, upon transmission of the messaging query 420 and connected answers, Controller style of the messaging generator 262 by selecting a next messaging query (or series of messaging querys) along the messaging execution path based on the selected interactive response. The first formula 272 may be provided as a JavaScript Object Notation (JSON) object.

According to one embodiment of the disclosure, each of the objects $280.sub.1-280.sub.N$ within the first formula 272 stored in storage medium is configured with messaging querys 420 and connected answers that solicit answers to complete an interactive form that is integrated as part of the first formula 272. When highlighted answer items are being used by the messaging participant, the particular selected answer items is highlighted and remains in a messaging 400 displayed by the second network node $120.sub.1$, as shown in FIG. 4.

Additionally, or in the alternative to providing selectable responses as shown in FIG. 4, the messaging generator 262 may generate one or more text boxes, which may prompt the messaging participant to enter personal identifiable information as an answer to a particular question (e.g., contact information, mailing address, employment information such as employer, occupation, years at employer, credit or membership card numbers, etc.). The Messaging augmentation logic may include the Info confirmation logic 266 that confirms the answers set forth in the text box are compliant with the type of personal identifiable information requested.

As illustrative examples, the Info confirmation logic 266 may confirm that, where the text field box is intended to receive a zip Programming logic, a five digit number is entered. Similar, as another illustrative example, where the text box is intended to receive a telephone number, the Info confirmation logic may confirm that ten numerals are entered and certain prefixes (e.g., "555" in the United States) are not entered. Alternatively, where the text box is intended to receive a certain type of character string (e.g., first/last name, city, etc.), no numbers or punctuation are included as part of the character strings. Hence, the Info confirmation logic 266 prevents or at least mitigates data entry errors.

The Messaging augmentation logic is automated so that, in accordance with the scripts 270, remains automated by continuing transmission of messaging querys 420 and their corresponding connected answers as long as the messaging participant continues to answer queries in accordance with one of the messaging execution paths set forth by scripts 270. In other words, based on the answers provided to the messaging querys 420 produced by the scripts 270 (e.g., first formula 272), the Messaging augmentation logic continues to generate and provide subsequent messaging querys 420 that formulate a messaging execution path until the messaging execution path has completed. Once the messaging execution path has completed, the interactive form represented by the first formula 272 has been answered and the Archived data, which pertains to answers for the messaging querys included in the first formula 272, is forwarded to a targeted recipient.

Additionally, if the messaging participant provides answers that are inconsistent with the current question along the messaging execution path or a "live" (human) operator is requested (e.g., editable edit box 460 is used by the messaging participant), the Messaging augmentation logic may notify the Messaging console logic 250 to connect an available "live" operator to the current messaging. Thereafter, the "live" operator can communicate in real-time with the messaging participant via the messaging 400 to collect data associated with a messaging query (or auto-select one or more connected answers to a particular messaging query) before returning the messaging participant to a messaging execution path provided by the first formula 272. This allows the messaging participant with a capability of requesting clarification on queries at any time.

Figure 5:
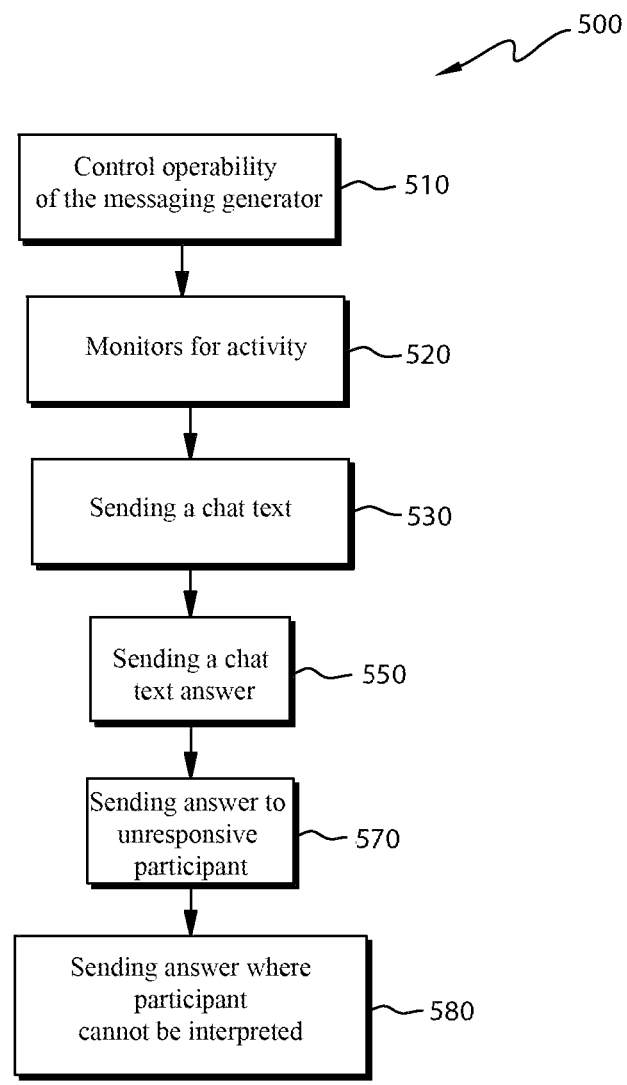
FIG. 5 is an illustrative embodiment of a flowchart identifying representative operations of the Messaging augmentation logic in generating a lead report to a targeted recipient.

Referring now to FIG. 5, an exemplary flowchart of the operations of the semi-automated, messaging service 140 of FIGS. 1-3 is shown. Employed as part of the Messaging augmentation logic, the messaging generator becomes operable in response to establishing a messaging (block 500). Based on the nature of the messaging learned by parsing information from an initial messaging communication (e.g., Messaging affirmation content) and interpreting the information, a script is selected to control operability of the messaging generator (block 510). The script may be selected from a plurality of scripts, where each script is configured to solicit answers to a set of queries representing a networked interactive form, which may be specific to a particular provider or group of providers.

In accordance with the script, the messaging generator generates for display successive messaging querys along with corresponding connected answers while the Messaging within the Messaging augmentation logic monitors for activity that denotes issues associated with the messaging. Examples of such activity may include, but is not limited or restricted to (a) sending a messaging text (or multiple messaging texts) in advance of the display of a messaging query that may represent growing impatience by the messaging participant, (b) sending a messaging text answer in lieu of selection of one of the connected answers, (c) sending messaging text answer by the messaging participant that is not responsive to a displayed messaging query being displayed, or (d) sending messaging text answer by the messaging participant cannot be interpreted by the Messaging to correspond to any of the connected answers provided with the messaging query.

It is contemplated that the messaging querys may be provided in a static order as outlined by the selected script. Alternatively, the messaging querys may be provided dynamically, where the ordering may be based, at least in part, on availability of the "live" operators. For instance, where the wait time is greater than a prescribed threshold, rudimentary messaging querys (e.g., name, phone number, etc.) may be generated for display while messaging querys of a more personal nature, which are more likely to trigger a request for a "live" operation (e.g., based on heuristics), are delayed as the "live" operators work to reduce the wait time.

In response to an issue with the messaging, the Messaging may signal the Messaging communication logic within the Messaging console logic to select a "live" operator to join and temporarily control the messaging. It is contemplated that the selection of the "live" operator may be based on a plurality of parameters, including a workload level of the operators, an expertise of the operator, a language spoken by the operator, or the like.

Besides monitoring the messaging querys and the answers to the messaging querys, the Messaging further monitors the style dictated by text (blocks 550-555). This monitoring is to ensure that behaviors that are outside the scope of direct interaction with the visitor during a messaging are consistent with expected behaviors. For example, displaying and updating a status bar that indicates the progress of the messaging is monitored to ensure accuracy of such display and updates. Also, verifying data such as a phone number against an external database to ensure validity may pertain to the behavioral monitoring.

The data gathering process continues until all of the messaging querys associated with the selected script (or a lesser but acceptable number based on activity by the messaging participant) have been answered. After completion, information associated with the answers are parsed and placed into a prescribed format for transmission to a targeted provider (blocks 570 and 580).

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "111100001010111100001111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT).

Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mutt," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand apply in a manner independent of a specific vendor's hardware implementation.

What is claimed:

1. A networked messaging system allowing multiple companies operating on a value chain to serve a customer simultaneously, the networked chat system functioning on a networked messaging system, including software for execution by one or more hardware processors deployed within a network node representing a main serving company, comprising:
   a messaging window for the customer displayable on at least four users involved in the networked chat system, each represented on one side of the messaging window, including one on a left side facing 90 degrees from a customer's position and one on a right side facing 90 degrees from the customer's position;
   messaging console logic that, when executed by the one or more hardware processors, monitors moving progress being conducted on a website associated with the network node and commences to establish a messaging dialogue window with a second network node representing a customer upon detecting a certain navigation activity; and
   messaging augmentation logic that, when executed by the one or more hardware processors,
   generates content associated with the messaging dialogue window, the content includes:
      (i) a messaging query,
      (ii) one or more connected answers to the messaging query that, upon selection, returns a predetermined answer to the messaging query,
      (iii) a text field, wherein, upon entry of text data within the text field that belongs to a customer question related to other secondary service providers including a second company and a third company, as interpreted by the messaging augmentation logic as any of the one or more connected answers, the messaging augmentation logic notifies the messaging console logic to bring in the other service providers to join the messaging dialogue window within the messaging window at same time by establishing communication with a third network node representing the second company displayed on the left side of the messaging window and a fourth network node representing the third company displayed on the right side of the messaging window, hence enabling a human operator from the second and third companies to participate in the messaging dialogue window; and
      (iv) a third party response from the either the second or third company;
   displays the content to the messaging window allowing the main serving company, the customer, the second company, and the third company to navigate the content; and
   monitors a progress of the messaging dialogue window, and continues to generate a subsequent messaging query along with connected answers corresponding to the subsequent messaging query, the connected answers include one or more highlighted answer items generated either by the main serving company, the customer, the second company, or the third company.

2. The networked messaging system of claim 1, wherein the messaging console logic includes visitor tracking service logic that, when executed, monitors the moving progress being conducted on the website hosted by the network node and transmits a messaging solicitation content in response to detecting the certain navigation activity.

3. The networked messaging system of claim 2, wherein the certain navigation activity corresponds to selection of a particular image or menu selection on the website.

4. The networked messaging system of claim 2, wherein the certain navigation activity corresponds to a particular pattern of navigation activity.

5. The networked messaging system of claim 2, wherein the messaging augmentation logic comprises a messaging generator that generates the content associated with the messaging dialogue window in accordance with a text executed by the messaging generator, the text being configured to correspond to either an industry or a provider pertaining to the website.

6. The network messaging system of claim 1, wherein each of the one or more highlighted answer items corresponds to a selectable display button.

7. The networked messaging system of claim 6, wherein the messaging console logic further includes messaging service logic that, when executed, conducts a secondary analysis on data received by the messaging augmentation logic during the messaging dialogue window when the Messaging control logic being unable to interpret data entered into the one or more connected answers.

8. A computerized method for networked messaging system allowing multiple companies operating on a value chain to serve a customer simultaneously, comprising:

generates content associated with a messaging dialogue window to be displayed on a messaging window for the customer displayable on at least four users involved in the networked chat system, each represented on one side of the messaging window, including one on a left side facing 90 degrees from a customer's position and one on a right side facing 90 degrees from the customer's position, the content includes:
  (i) a messaging query,
  (ii) one or more connected answers to the messaging query that, upon selection, returns a predetermined answer to the messaging query,
  (iii) a text field, wherein, upon entry of text data within the text field that belongs to a customer question related to other secondary service providers including a second company and a third company, as interpreted by the messaging augmentation logic as any of the one or more connected answers, the messaging augmentation logic notifies the messaging console logic to bring in the other service providers to join the messaging dialogue window within the messaging window at same time by establishing communication with a third network node representing the second company displayed on the let side of the messaging window and a fourth network node representing the third company displayed on the right side of the messaging window, hence enabling a human operator from the second and third companies to participate in the messaging dialogue window; and
  (iv) a third party response from the either the second or third company; and displays the content to the messaging window allowing the main serving company, the customer, the second company, and the third company to navigate the content in a messaging window, the messaging window; and monitors a progress of the messaging dialogue window, and continues to generate a subsequent messaging query along with connected answers corresponding to the subsequent messaging query, the connected answers include one or more highlighted answer items generated either by the main serving company, the customer, the second company, or the third company.

* * * * *